US012789921B2

(12) United States Patent
Bondre et al.

(10) Patent No.: US 12,789,921 B2
(45) Date of Patent: Nov. 10, 2026

(54) MODULAR VEHICLE PANELS

(71) Applicant: Rivian IP Holdings, LLC, Irvine, CA (US)

(72) Inventors: Abhishek Bondre, Lake Forest, CA (US); Gavin Smith, Irvine, CA (US); Vera Venkata Satya Srinivas Mummidivarapu, Novi, MI (US); Mark Lennard Taylor, Laguna Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 563 days.

(21) Appl. No.: 18/343,548

(22) Filed: Jun. 28, 2023

(65) Prior Publication Data

US 2025/0002094 A1 Jan. 2, 2025

(51) Int. Cl.
*B62D 33/04* (2006.01)
*B62D 25/02* (2006.01)

(52) U.S. Cl.
CPC ........... *B62D 33/046* (2013.01); *B62D 25/02* (2013.01)

(58) Field of Classification Search
CPC .. B62D 33/046; B62D 33/077; B62D 25/087; B62D 25/02; B62D 27/065; B62D 29/045; B62D 29/005
USPC ......... 296/186.1, 186.3, 186.5, 181.3, 181.6, 296/191, 193.03
See application file for complete search history.

(56) References Cited

U.S. PATENT DOCUMENTS 6,276,748 B1 * 8/2001 Gobessi ............... B62D 33/044 296/26.08
2002/0180238 A1 * 12/2002 Sill ...................... B62D 29/045 296/186.1
2018/0229641 A1 * 8/2018 Ehrlich ................ B62D 33/046
2025/0196937 A1 * 6/2025 Ruiz-Ramon ............. B32B 7/12

FOREIGN PATENT DOCUMENTS

DE 3916065 A1 * 11/1990 ........... B62D 33/046
GB 2391841 A * 2/2004 ........... B62D 29/008
KR 20090064837 A * 6/2009 ............. B29C 44/24

OTHER PUBLICATIONS

Wichmann et al. (DE 3916065 A1), machine translation (Year: 1990).*
Kim et al. (KR 20090064837), machine translation (Year: 2009).*

* cited by examiner

*Primary Examiner* — Wenwei Zhuo
(74) *Attorney, Agent, or Firm* — Foley & Lardner LLP

(57) ABSTRACT

An apparatus including a connector structure. The connector structure can connect a first vehicle panel with a second vehicle panel. The connector structure can be disposed between the first vehicle panel and the second vehicle panel. The connector structure can include a first adhesive to adhere the connector structure to the first vehicle panel and a second adhesive to adhere the connector structure to the second vehicle panel.

20 Claims, 12 Drawing Sheets

MODULAR VEHICLE PANELS

INTRODUCTION

Vehicles include panels that can form at least a portion of a body of the vehicle.

SUMMARY

This disclosure is generally related to one or more components of a vehicle. The components can include at least one vehicle panel and at least one apparatus. The components can be included in or associated with the vehicle. The apparatus can include at least one structure. The structure can be adhered to the vehicle panel. The structure can also be disposed in a core or cavity defined between a first vehicle panel and a second vehicle panel. The structure can be or include a honeycomb design or pattern. The structure can also be or include a crosshatched design or pattern. The vehicle panels can be coupled with the vehicle. The vehicle panels can be disposed along a chassis of the vehicle and the vehicle panels can define at least a portion of a body of the vehicle. For example, the vehicle panels can define a cargo area or a rear storage compartment of a commercial vehicle.

At least one aspect is directed to an apparatus. The apparatus can include a connector structure. The connector structure can connect a first vehicle panel with a second vehicle panel. The connector structure can be disposed between the first vehicle panel and the second vehicle panel, and the connector structure can include a first adhesive to adhere the connector structure to the first vehicle panel and a second adhesive to adhere the connector structure to the second vehicle panel.

At least one aspect is directed to a vehicle. The vehicle can include an apparatus. The apparatus can include a connector structure. The connector structure can connect a first vehicle panel with a second vehicle panel. The connector structure can be disposed between the first vehicle panel and the second vehicle panel, and the connector structure can include a first adhesive to adhere the connector structure to the first vehicle panel and a second adhesive to adhere the connector structure to the second vehicle panel.

At least one aspect is directed to a method. The method can include connecting a connector structure to a first adhesive and a second adhesive. The method can also include disposing the connector structure between a first vehicle panel and a second vehicle panel. The first adhesive to adhere to the connector structure to the first vehicle panel and the second adhesive to adhere the connector structure to the second vehicle panel.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
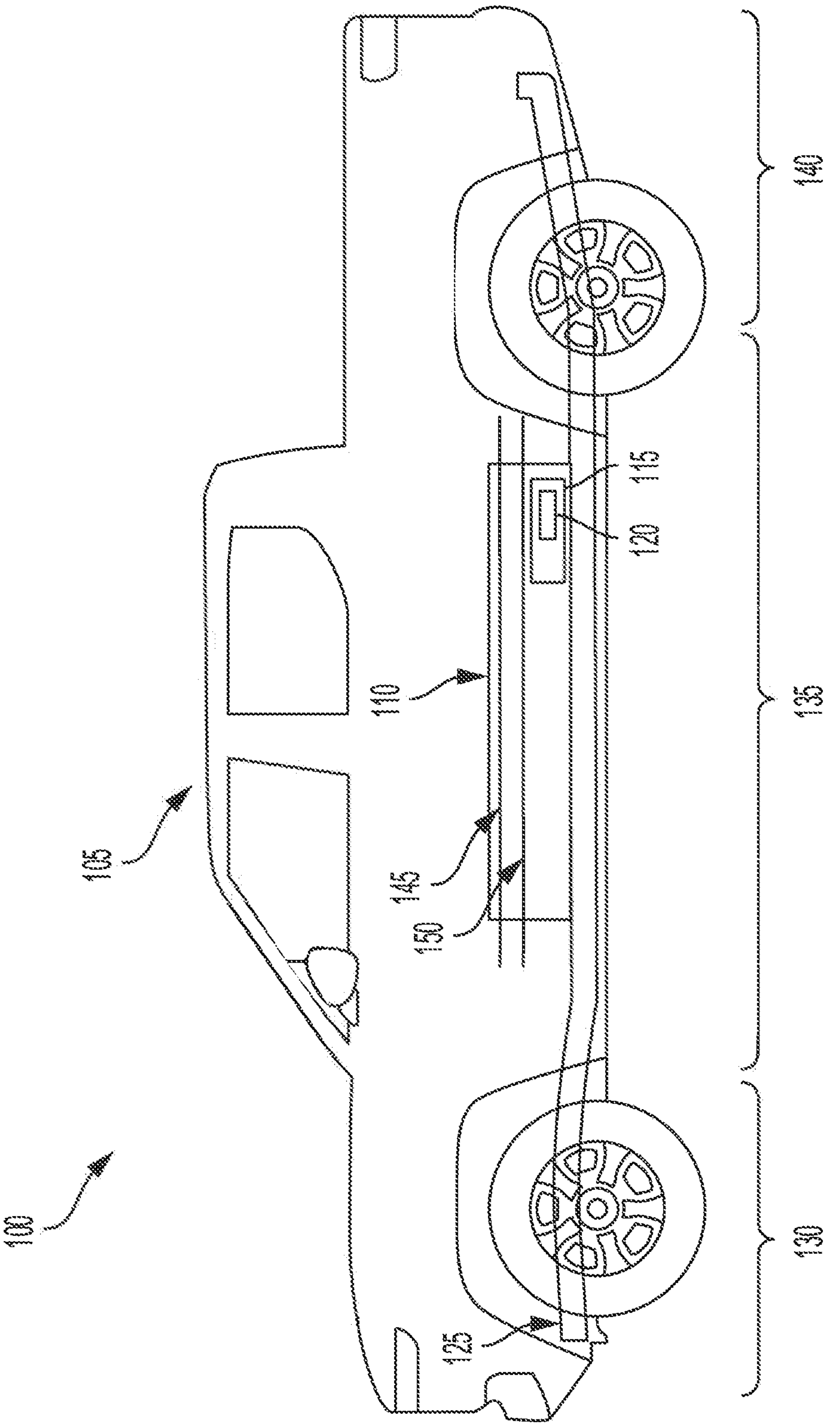
FIG. 1 depicts an electric vehicle, in accordance with an implementation.

Following below are more detailed descriptions of various concepts related to, and implementations of, methods, apparatuses, and systems of sandwiched modular vehicle panels for vehicles. The various concepts introduced above and discussed in greater detail below may be implemented in any of numerous ways.

The present disclosure is directed to systems and methods of one or more components for a vehicle. The one or more components can include at least one vehicle panel and at least one apparatus. The one or more components can be mounted, attached, placed, secured, or otherwise coupled with the vehicle. For example, the vehicle panels can be coupled with a fleet vehicle and the vehicle panels can define a structure or a body of the vehicle.

The apparatus can include the vehicle panels, or the vehicle panels can be provided as separate components for the vehicle. The vehicle panels can be or include body panels. The apparatus can also include a structure that can be disposed between vehicle panels. For example, the structure can be disposed within a cavity defined by a first vehicle panel and a second vehicle panel. The structure can provide thermal insulation for the vehicle panels. The structure can also provide rigidity to the vehicle panels as the structure can be disposed in a hollow area (e.g., the cavity) between the vehicle panels. The structure can also provide a uniform load distribution to forces applied to the vehicle panels as the structure can assist in dispersing loads applied to the vehicle panels across the surface area of the structure.

The vehicle panels can be modular vehicle panels that can provide flexibility and case of use. The vehicle panels can be coupled with one another to form an outside structure and an inside structure of vehicle. For example, a first vehicle panel can be coupled with a second vehicle panel. The first vehicle panel can be an external vehicle and the second vehicle panel can be an internal vehicle panel. For example, a first surface of the first vehicle panel can be disposed external to the vehicle and a first surface of the second vehicle panel can be disposed inside of the vehicle. The first vehicle panel and the second vehicle panel can also be coupled with a third vehicle panel and a fourth vehicle panel. The coupling of the first vehicle panel and the second vehicle panel with the third vehicle panel and the fourth vehicle panel can establish at least one of a housing, an assembly, a compartment, or a body of a vehicle. For example, the vehicle panels can be coupled with a chassis of a commercial vehicle (e.g., a cargo van, box truck, etc.) and the vehicle panels can be disposed across the chassis of the commercial vehicle to create or establish a rear storage compartment of the vehicle.

The vehicle panels can be arranged, orientated, shaped, or otherwise formed to result in a first vehicle panel aligning with a second vehicle panel. For example, a concave curvature of a first portion or first surface of the first vehicle panel can align with a convex curvature of a first portion or first surface of the second vehicle panel. The first vehicle panel and the second vehicle panel can be coupled with one another via one or more adhesives. The adhesives can couple the vehicle panels with the structure. For example, a first adhesive can be disposed on a first side of the structure and a second adhesive can be disposed on a second side of the structure. The first adhesive can couple with the first vehicle panel and the second adhesive can couple with the second vehicle panel. The adhesives coupling with the first vehicle panel and the second vehicle panel can mount, attach, place, secure, or otherwise couple the first vehicle panel with the second vehicle panel. The first vehicle panel coupled with the second vehicle panel can be referred to as an adhered vehicle panel.

The adhered vehicle panels can be coupled with the vehicle. For example, the adhered vehicle panels can include one or more apertures or openings disposed along a surface of the adhered vehicle panels. The apertures of the adhered vehicle panels can be positioned or otherwise located to align with or correspond to positions or locations of one or more apertures or openings disposed along a structure of the vehicle. For example, a chassis of the vehicle can include or be coupled with a vertical fixture. The vertical fixture can include one or more apertures disposed along a surface of the vertical fixture. The apertures of the adhered vehicle panels can align with the apertures of the vertical fixture and one or more fasteners can be inserted into or otherwise interact with the apertures of the adhered vehicle panels and the apertures of the vertical fixture to couple the adhered vertical panels with the vertical fixture.

The disclosed solutions have a technical advantage of providing modular vehicle panels that can be coupled with a vehicle via fasteners (e.g., bolts, screws, latches, pins, or among other possible fastening equipment). The coupling of the vehicle panels with the vehicle via fasteners results in the vehicle panels being removably coupled with the vehicle (e.g., the vehicle panels can be decoupled from the vehicle and then recoupled with the vehicle). The modular vehicle panels being removably coupled with the vehicle provides a technician, a mechanic, or a service provider the freedom to repair, replace, or reconfigure the panels without permanently decoupling or detaching the panels from the vehicle. For example, a technician can access a vehicle panel coupled with the vehicle by simply removing the fasteners removably coupling the vehicle panel with the vehicle. The technician can perform one or more actions pertaining to the vehicle panels. For example, the technician can replace a damaged vehicle panel with a new vehicle panel and the new vehicle panel can be removably coupled with the vehicle via the fasteners.

Systems and methods of the present technical solution also include providing the structure that can be disposed between the modular vehicle panels. The structure can provide an energy savings for the vehicle as the amount of insulation or insulation factor, provided by the structure, between the external environment and the inside of the vehicle is larger than the amount of insulation provided in traditional vehicle panels. The increase in the insulation can result in less frequent use of cooling systems or heating systems to maintain an internal temperature of the storage compartment of the vehicle. The load distribution provided by the structure also contributes to a decrease in weight of the vehicle panels as the vehicle panels can be made of a lighter material while having a similar strength to heavier vehicle framing.

While the systems and methods of the present disclosure provide several examples and implementations with respect to commercial vehicles, the present disclosure is also applicable to non-commercial vehicles and other possible vehicles (e.g., the various other types of vehicles described herein).

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
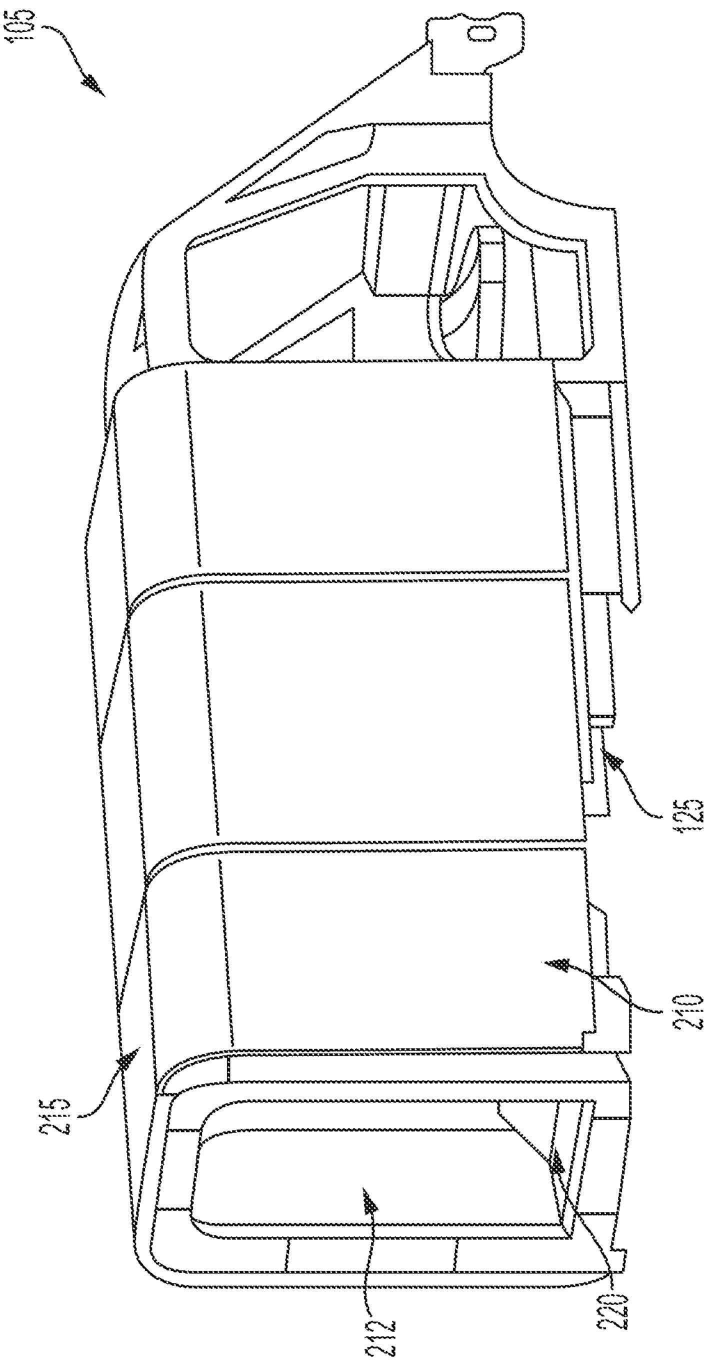
FIG. 2 depicts a portion of a vehicle implementing vehicle panels, in accordance with an implementation.

FIG. 2 depicts an example view of the vehicle 105. The vehicle 105 is shown as a commercial vehicle (e.g., a cargo van, a delivery vehicle, or a service vehicle). The vehicle 105 can include at least one vehicle panel. For example, the vehicle 105 can include at least one vehicle panel 210 and at least one vehicle panel 212. The vehicle panels 210 can be or include the vehicle panels described herein. The vehicle panels 210 can be referred to as at least one of external vehicle panels or body-side-out vehicle panels. For example, the vehicle panels 210 can be disposed, positioned, placed, or otherwise located external to a body of the vehicle 105. The vehicle panels 212 can be or include the vehicle panels described herein. The vehicle panels 212 can be referred to as at least one of internal vehicle panels or body-side-in vehicle panels. For example, the vehicle panels 212 can be disposed, positioned, placed, or otherwise located within a portion of the vehicle 105.

The external vehicle panels 210 can be coupled with the vehicle 105. For example, a top portion or a first area of the external vehicle panels 210 can be coupled with a roof 215 of the vehicle 105. A bottom portion or second area of the external vehicle panels 210 can be coupled with the chassis 125 or a fixture of the chassis 125. An external vehicle panel 210 can be coupled with one or more other external vehicle panels 210. For example, a first external vehicle panel 210 can have a first portion that extends, reaches, or otherwise overlaps with a first portion of a second external vehicle panel 210. The first portion of both external vehicle panels 210 can include at least one overlapping opening and a fastener can attach, place, mount, secure, or otherwise couple the first external vehicle panel 210 with the second external vehicle panel 210.

The internal vehicle panels 212 can be coupled with the vehicle 105. For example, the internal vehicle panels 212 can be coupled with a fixture or structure of the vehicle 105. An internal vehicle panel 212 can be coupled with one or more internal vehicle panels 212. For example, at least a portion of a first internal vehicle panel 212 can reach, extend, or otherwise overlap with at least a portion of a second internal vehicle panel 212. The portion of the first internal vehicle panel 212 and the portion of the second internal vehicle panel 212 can include overlapping openings and a fastener can be placed, located, or otherwise inserted into the overlapping openings to couple the first internal vehicle panel 212 with the second internal vehicle panel 21.

At least one external vehicle panel 210 can be coupled with at least one internal vehicle panel 212. For example, the structure described herein can adhere a first external vehicle panel 210 to a first internal vehicle panel 212. The structure adhering the first external vehicle panel 210 to the first internal vehicle panel 212 can form the adhered vehicle panels described herein (e.g., an adhered vehicle panel including an external vehicle panel 210 and an internal vehicle panel 212).

The adhered vehicle panels can be coupled with one another. For example, A first adhered vehicle panel can be coupled with a second adhered vehicle panel. FIG. 2 depicts an example of three adhered vehicle panels coupled with one another. The adhered vehicle panels can be coupled with one another responsive to at least one of the coupling of the internal vehicle panels 212 with one another, the coupling of the external vehicle panels 210 with one another, or various possible combinations.

The adhered vehicle panels can be coupled with the vehicle 105. For example, the adhered vehicle panels can be coupled with the vehicle 105 via one or more fasteners. One or more portions of the adhered vehicle panels or components thereof (e.g., the internal vehicle panels 212 or the external vehicle panels 210) can be coupled with the vehicle 105 or a component thereof. For example, the internal vehicle panels 212 or the external vehicle panels 210 can include at least one opening or aperture that corresponds to, aligns with, or otherwise is located proximate to at least one opening or aperture of the vehicle 105 or a component thereof. The openings of the vehicle panels 210, the openings of the vehicle panels 212, or the openings of the vehicle 105 can obtain, receive, or otherwise accept one or more fasteners. The adhered vehicle panels can be coupled with the vehicle 105 via the fasteners.

The adhered vehicle panels can define an area 220 of the vehicle 105. The area 220 can be a rear storage area of the vehicle 105. For example, the adhered vehicle panels can be disposed, located, placed, or otherwise positioned behind a cab of the vehicle 105. The adhered vehicle panels can be coupled with one or more portions of the vehicle 105. For example, the adhered vehicle panels can be coupled with the chassis 125 at multiple points (e.g., a first adhered vehicle panel is coupled with the chassis 125 at a first point and a second adhered vehicle panel is coupled with the chassis 125 at a second point). The adhered vehicle panels can encompass, surround, or otherwise enclose a portion of the vehicle 105. The adhered vehicle panels enclosing the portion of the vehicle 105 can define the rear storage area 220 of the vehicle 105.

The external vehicle panels 210 and the internal vehicle panels 212 can be removably coupled with the vehicle 105 via the fasteners. For example, the vehicle panels 210, 212 can be coupled with the vehicle 105 via one or more fasteners and the fasteners can be removed to decouple the vehicle panels 210, 212 from the vehicle 105. The vehicle panels 210,212 being removably coupled with the vehicle 105 provides some of the technical solutions described herein as the vehicle panels 210, 212 can be removed quickly and easily as an operator or technician servicing the vehicle 105 can simply decouple the vehicle panels 210, 212 from the vehicle 105 by removing the fasteners.

The removably coupling of the vehicle panels 210, 212 with the vehicle 105 eliminates having to use more permanent coupling techniques (e.g., welding or crimping) when coupling the vehicle panels 210, 212 with one another or with portions of the vehicle 105 (e.g., the chassis 125, the roof 215). For example, a technician could repair or replace an adhered vehicle panel of a vehicle 105 that is out in the field (e.g., the vehicle 105 is servicing an area) without having the vehicle 105 brought to a service center. The technician can repair the adhered vehicle panel when the vehicle 105 is out in the field as the technician would only need to use simply power tools (e.g., an impact wrench, a drill, etc.) to remove the fasteners to decouple the vehicle panels 210, 212 from the vehicle 105 and then recouple the repaired or replaced panels with the vehicle 105 via the fasteners. The simple replacement of the vehicle panels 210, 212 (e.g., a damaged vehicle panel 210, 212 can be replaced) can result in the vehicle 105 returning to servicing the area with minimal downtime (e.g., the amount of time it takes for the technician to replace the vehicle panel 210,212). If the vehicle panels 210, 212 were more permanently coupled with one another (e.g., welding the panels together) the service time would be much larger.

While FIG. 2 depicts the vehicle 105 as having a given number of vehicle panels 210 and a given number of vehicle panels 212, the vehicle 105 can include multiple different numbers of vehicle panels 210, 212. For example, the vehicle 105 can include less than three external vehicle panels 210 or the vehicle 105 can include more than three external vehicle panels 210. Additionally, while the vehicle panels 210, 212 are shown to have a similar shape and size to one another, the size of each vehicle panel 210, 212 can vary from that shown. For example, a first external vehicle panel 210 can be larger than a second external vehicle panel 210. The external vehicle panels 210, even though as shown in FIG. 2 extend to the roof 215, can be coupled with the vehicle 105 without extending to the roof 215.

Figure 3:
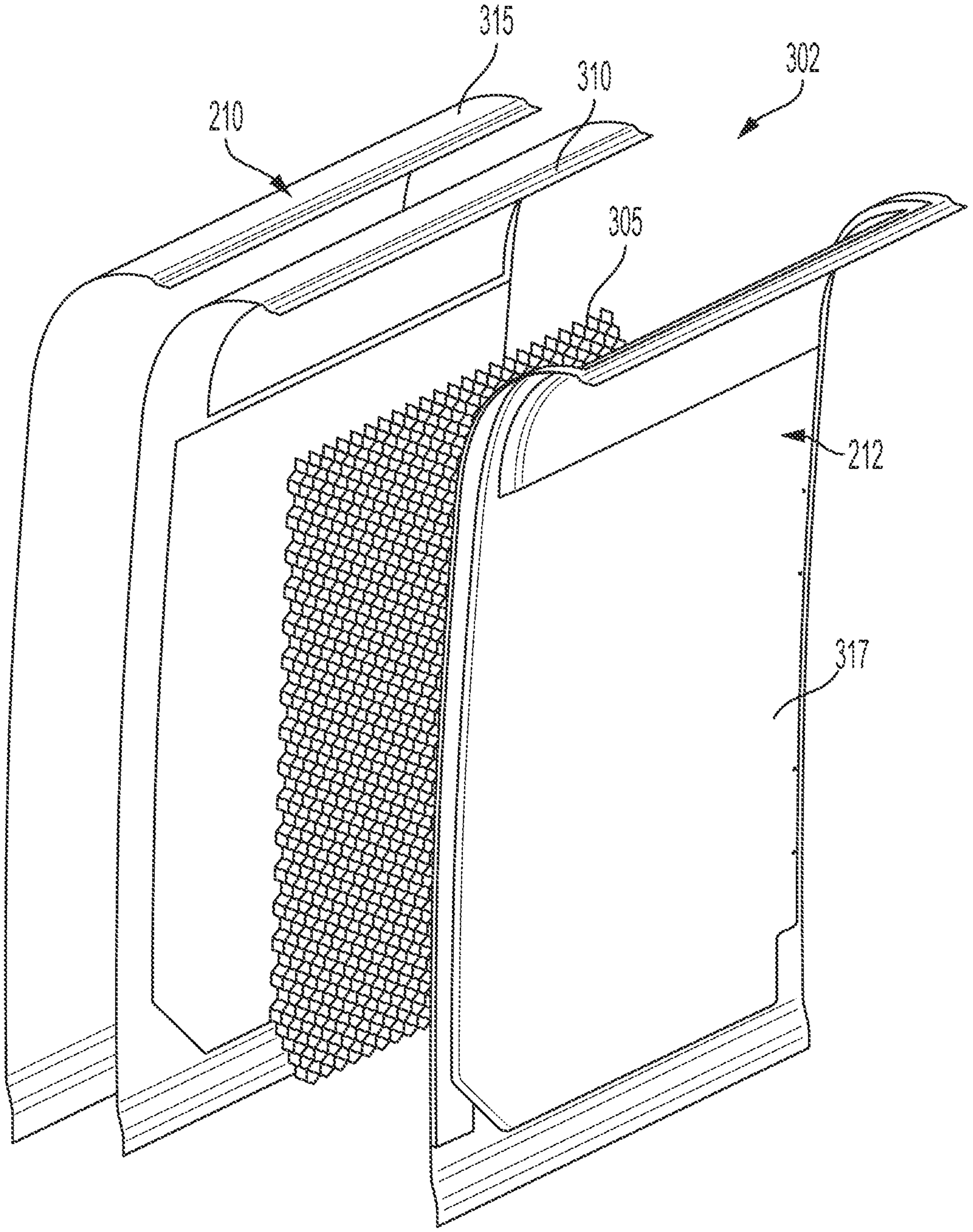
FIG. 3 depicts a perspective view of the vehicle panels illustrated in FIG. 2 and an apparatus, in accordance with an implementation.

FIG. 3 depicts a perspective view of the external vehicle panels 210, the internal vehicle panels 212, and an apparatus 302. The external vehicle panels 210, the internal vehicle panels 212, and the apparatus 302 can be or include one or more components for the vehicle 105. The apparatus 302 can be or include the apparatus described herein. The apparatus 302 can include a structure 305. The apparatus 302 can include at least one of the external vehicle panels 210 or the internal vehicle panels 212. The apparatus 302 can be provided with the vehicle panels 210, 212. The apparatus 302 and the vehicle panels 210, 212 can be provided as separate components for the vehicle 105. The structure 305 can be or include the structure described herein. The structure 305 can be a connector structure. The structure 305 can be disposed between at least one vehicle panel 210 or at least one vehicle panel 212. For example, the structure 305 can be disposed between an external vehicle panel 210 and an internal vehicle panel 212. The structure 305 can mount, attach, place, secure, or otherwise couple vehicle panels 210, 212 with one another. For example, the structure 305 can connect a first external vehicle panel 210 with a first internal vehicle panel 212. The structure 305 connecting the first external vehicle panel 210 with the first internal vehicle panel 212 can form the adhered vehicle panels described herein.

The structure 305 can include at least one adhesive 310. The adhesives 310 can be or include the adhesives described herein. The adhesives 310 can be or include at least one of a film or sheet. The adhesives 310 can mount, attach, place, secure, or otherwise couple the structure 305 with the vehicle panels 210, 212. For example, a first adhesive 310 can adhere the structure 305 to an external vehicle panel 210 and a second adhesive 310 can adhere the structure 305 to an internal vehicle panel 212. The adhering of the structure 305, via the adhesives 310, with the vehicle panels 210, 212 can connect the external vehicle panel 210 with the internal vehicle panel 212.

The external vehicle panels 210 can include at least one surface 315. For example, a first external vehicle panel 210 can include a first surface 315 and a second surface 315. The surfaces 315 can include at least one of a front surface, a back surface, an external surface, or an internal surface. The external vehicle panels 210 can have a first surface 315 that can be connected, via the adhesives 310, with the structure 305 and a second surface 315 that can be facing outside of the vehicle 105 (e.g., the second surface 315 is an external surface disposed external to the vehicle 105). The internal vehicle panels 212 can include at least one surface 317. For example, a first internal vehicle panel 212 can have a first surface 317 and a second surface 317. The surfaces 317 can include at least one of a front surface, a back surface, an external surface, or an internal surface. The internal vehicle panels 212 can have a first surface 317 that can be connected, via the adhesives 310, with the structure 305 and a second surface 317 that can be facing inside of the vehicle 105 (e.g., the second surface 317 is an internal surface disposed inside of the vehicle 105).

FIG. 3 depicts an example of the external vehicle panels 210 having a surface 315 that is an external surface (e.g., the surface 315 can be disposed external to the vehicle 105) and an example of the internal vehicle panels 212 having a surface 317 that is an internal surface (e.g., the surface 317 can be disposed inside of the vehicle 105). As shown in FIG. 3, the external vehicle panels 210 can be referred to as a body-side-out vehicle panel (e.g., at least a portion of the external vehicle panels 210 can be disposed external to the vehicle 105) and the internal vehicle panel 212 can be referred to as a body-side-in vehicle panel (e.g., at least a portion of the second vehicle panel 210 can be disposed inside of the vehicle 105).

The vehicle panels 210, 212 can include at least one insulation value (e.g., an amount of insulation provided by the vehicle panels 210, 212). For example, a first external vehicle panel 210 coupled with a first internal vehicle panel 212 can provide or have a first insulation value. The structure 305 can include at least one insulation value (e.g., an amount of insulation provided by the structure 305). For example, the structure 305 can provide or have a second insulation value. The insulation value of the structure 305 (e.g., the second insulation value) can be larger than the insulation value of the vehicle panels 210, 212 (e.g., the first insulation value). The structure 305 having an insulation value larger than the insulation value of the vehicle panels 210, 212 may result in the structure 305 providing a greater amount of insulation in comparison to the vehicle panels 210, 212.

Figure 4:
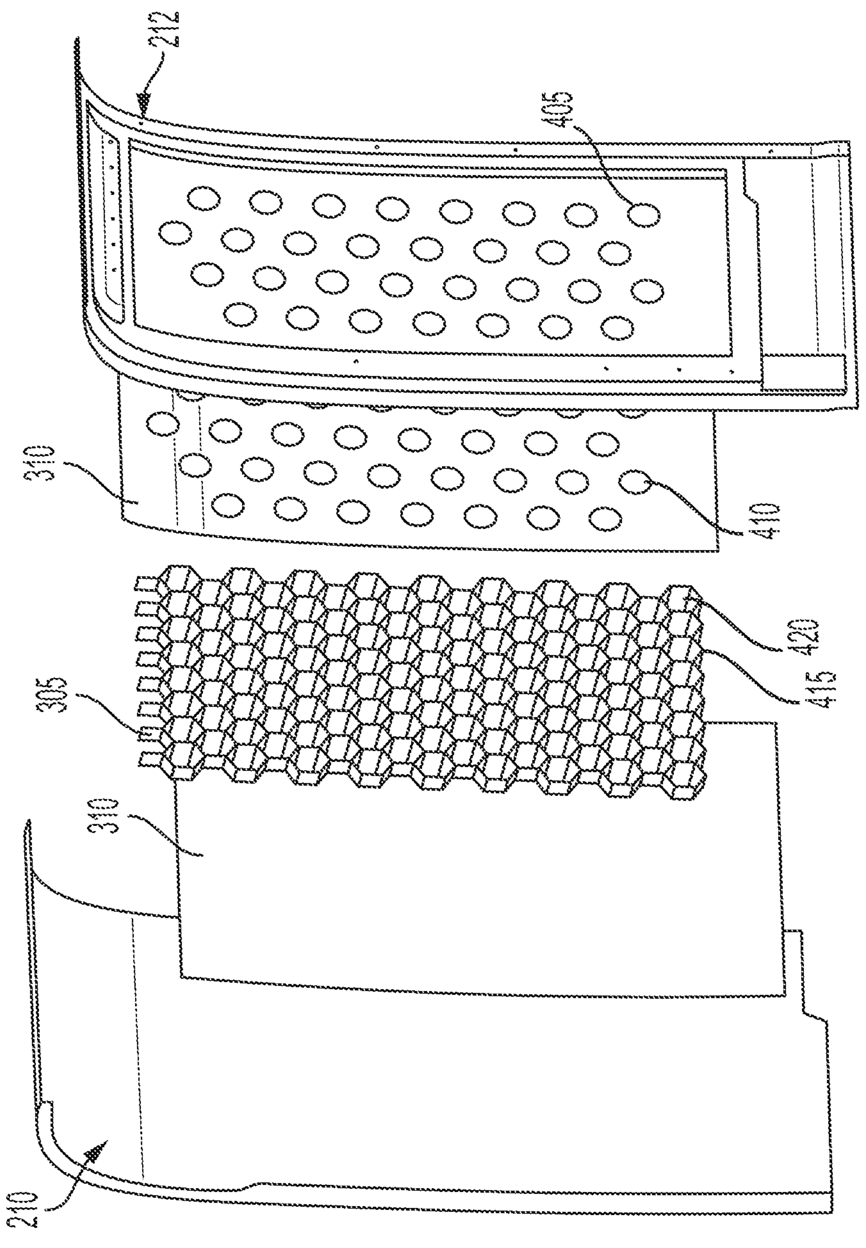
FIG. 4 depicts a perspective view of the vehicle panels illustrated in FIG. 2 and an apparatus, in accordance with an implementation

FIG. 4 depicts a perspective view of the vehicle panels 210, 212, and the apparatus 302. The vehicle panels 212 can include at least one emboss feature 405. The emboss features 405 can be or include at least one of an imprint, a stamp, a recess, a notch, an indent, a groove, or among other possible features. The emboss features 405 can be placed, disposed, positioned, or otherwise located along the surface 317. FIG. 4 depicts an example of the emboss features 405 including a teacup stamp. The emboss features 405 can provide stiffness for the vehicle panels 212. For example, the emboss features 405 can disperse or otherwise change the relative surface area (e.g., the surface area of the surfaces 315) of the vehicle panels 212 to provide a stiffness factor (e.g., the vehicle panels 212 ability to return to its original shape after a load or pressure was applied to the vehicle panels).

The adhesives 310 can include at least one aperture 410 or opening 410. The apertures 410 can be or include at least one or more slots or one or more holes. The apertures 410 can correspond to or otherwise align with the emboss features 405. For example, the apertures 410 can have a similar size or similar placement to that of the emboss features 405 resulting in the adhesives 310 contacting the surface 317 of the vehicle panels 212 that excludes the emboss features 405. The adhesives 310 excluding contact points with the emboss features 405 can strengthen the connection between the structure 305 and the vehicle panels 212 as the apertures 410 create multiple contact points having a small area relative to a single contact point having a large area.

The structure 305 can include at least one cell 415. The cells 415 can disperse a load applied to at least one vehicle panel 210, 212. For example, the cells 415 can extend along a length of the vehicle panels 210, 212 and as a load is applied to a point along the vehicle panels 210, 212 the load can be dispersed across the cells 415 to aid in load distribution. The cells 415 can include at least one configuration, design, pattern, or shape. For example, the structure 305 can include cells having a honeycomb shape. FIG. 4 depicts an example, the structure 305 having cells 415 with a honeycomb shape. The cells 415 can define one or more pockets 420. The pockets 420 can be or include the area enclosed by or otherwise confined between the cells 415.

Figure 5:
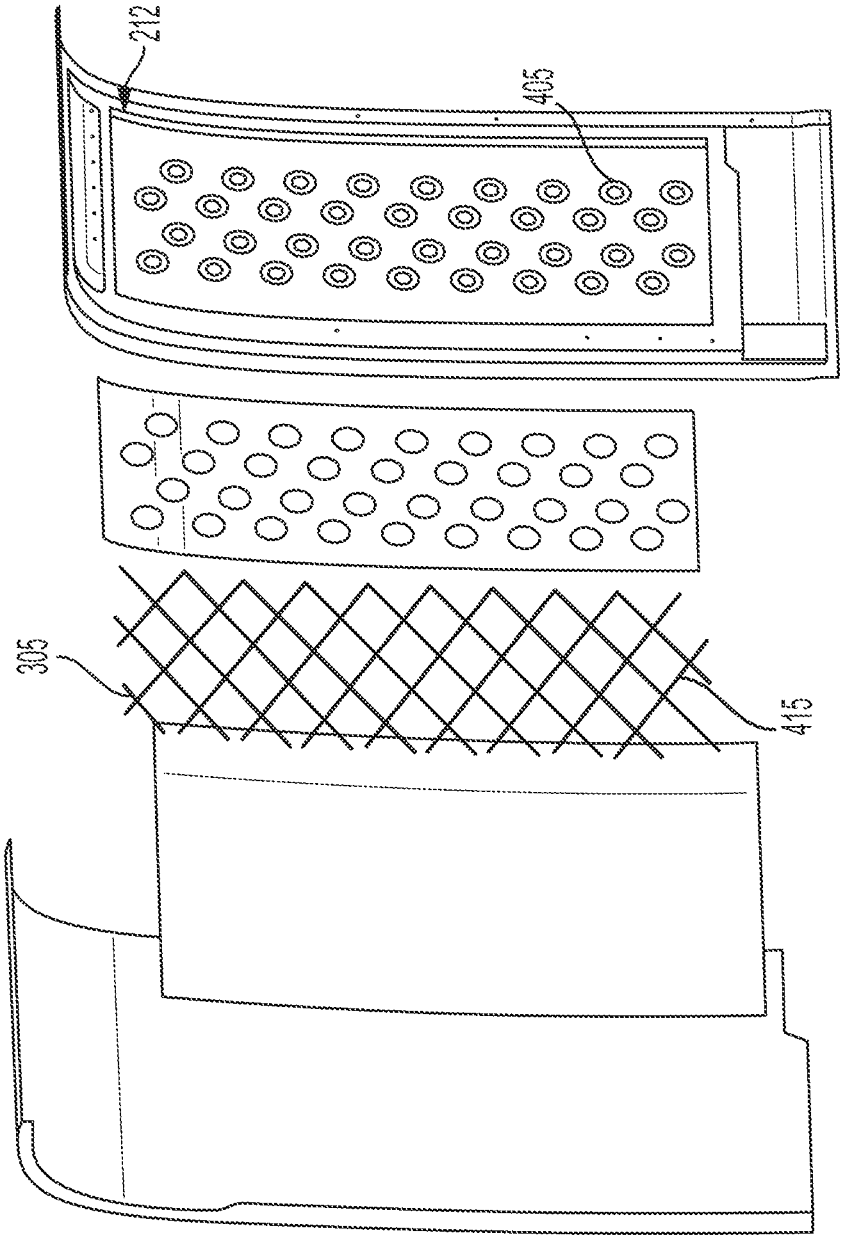
FIG. 5 depicts a perspective view of the vehicle panels illustrated in FIG. 2 and an apparatus, in accordance with an implementation

FIG. 5 depicts a perspective view of the vehicle panels 210, the vehicle panels 212, and the apparatus 302. At least a portion of the structure 305 can include at least one of an aluminum material, an aramid material, a synthetic fiber material, among other possible materials. For example, the cells 415 can include aramid material. FIG. 5 depicts an example of the structure 305 having a lattice shape as the cells 415 are shown to be arranged in a diamond pattern.

Figure 6:
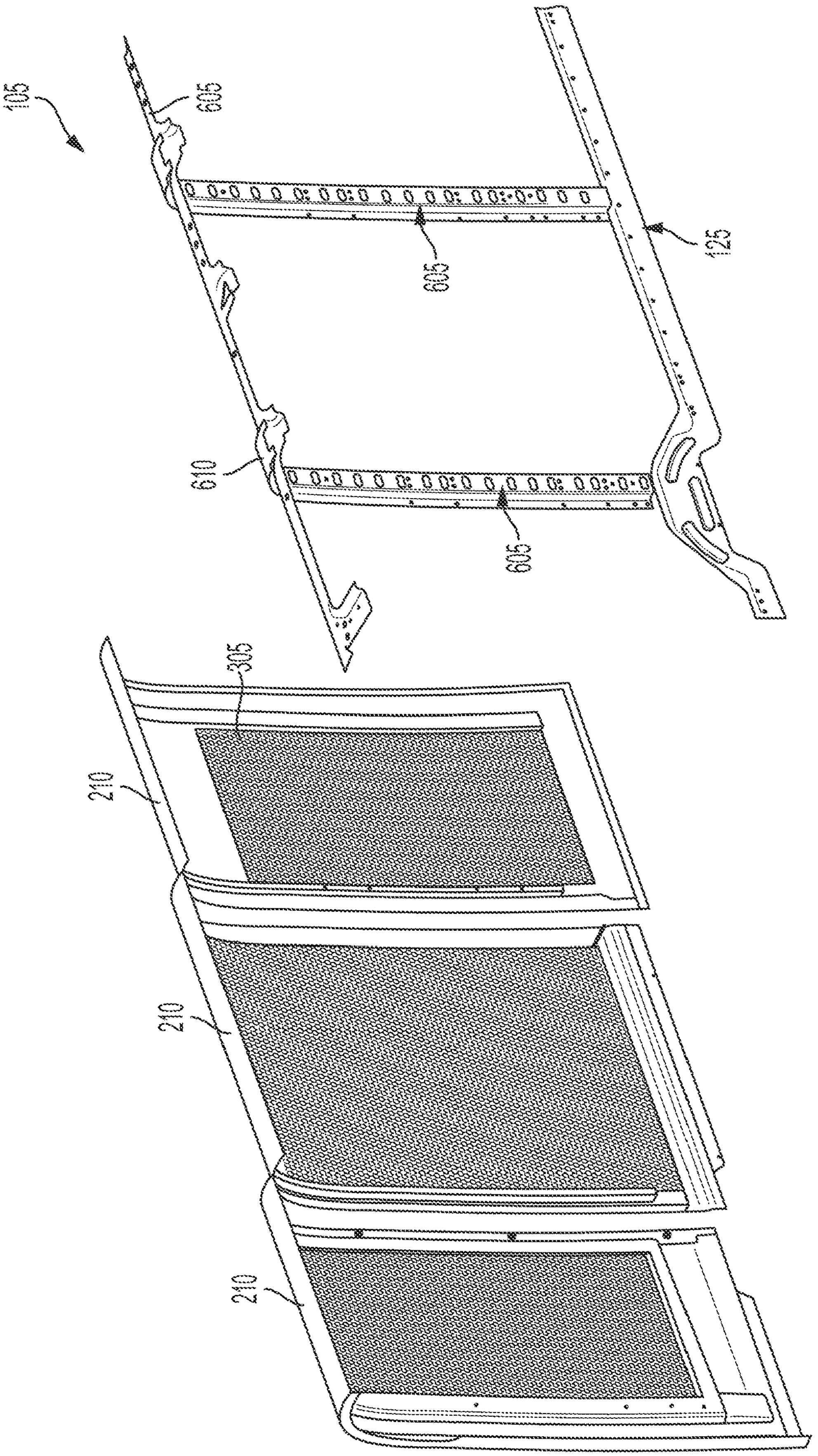
FIG. 6 depicts a perspective view of the vehicle panels illustrated in FIG. 2 and components of the vehicle illustrated in FIG. 2, in accordance with an implementation.

FIG. 6 depicts a perspective view of the vehicle panels 210, the structure 305, and components of the vehicle 105. As illustrated in FIG. 6, the internal vehicle panels 212 have been removed to show the structures 305 disposed between the external vehicle panels 210 and the internal vehicle panels 212. However, the removal of the internal vehicle panels 212 is for illustration purposes only. The vehicle 105 can include at least one fixture 605. The fixtures 605 can be or include at least one of a portion of framing, a beam, a post, a strut, or among other possible support structures. The fixtures 605 can be coupled with the chassis 125. The fixtures 605 can include one or more openings corresponding to one or more openings of the vehicle panels 210, 212. For example, the openings of the fixtures 605 can align with the openings of the vehicle panels 210, 212 providing an area for a fastener to couple the vehicle panels 210, 212 with the fixtures 605.

The vehicle 105 can include at least one brace 610. The braces 610 can be coupled with the chassis 125. At least a portion of the braces 610 can be disposed between the fixtures 605 and the vehicle panels 210, 212. The braces 610 can wrap around, reach over, or otherwise extend beyond the fixtures 605 to provide a horizontal coupling point for the vehicle panels 210, 212 (e.g., a place or area for a top portion of the vehicle panels 210, 212 to couple with the vehicle 105). The braces 610 can include one or more openings corresponding to one or more openings of the vehicle panels 210, 212. For example, the openings of the braces 610 can align with the openings along a top portion of the vehicle panels 210, 212 providing an area for a fastener to couple the vehicle panels 210 with the braces 610.

Figure 7:
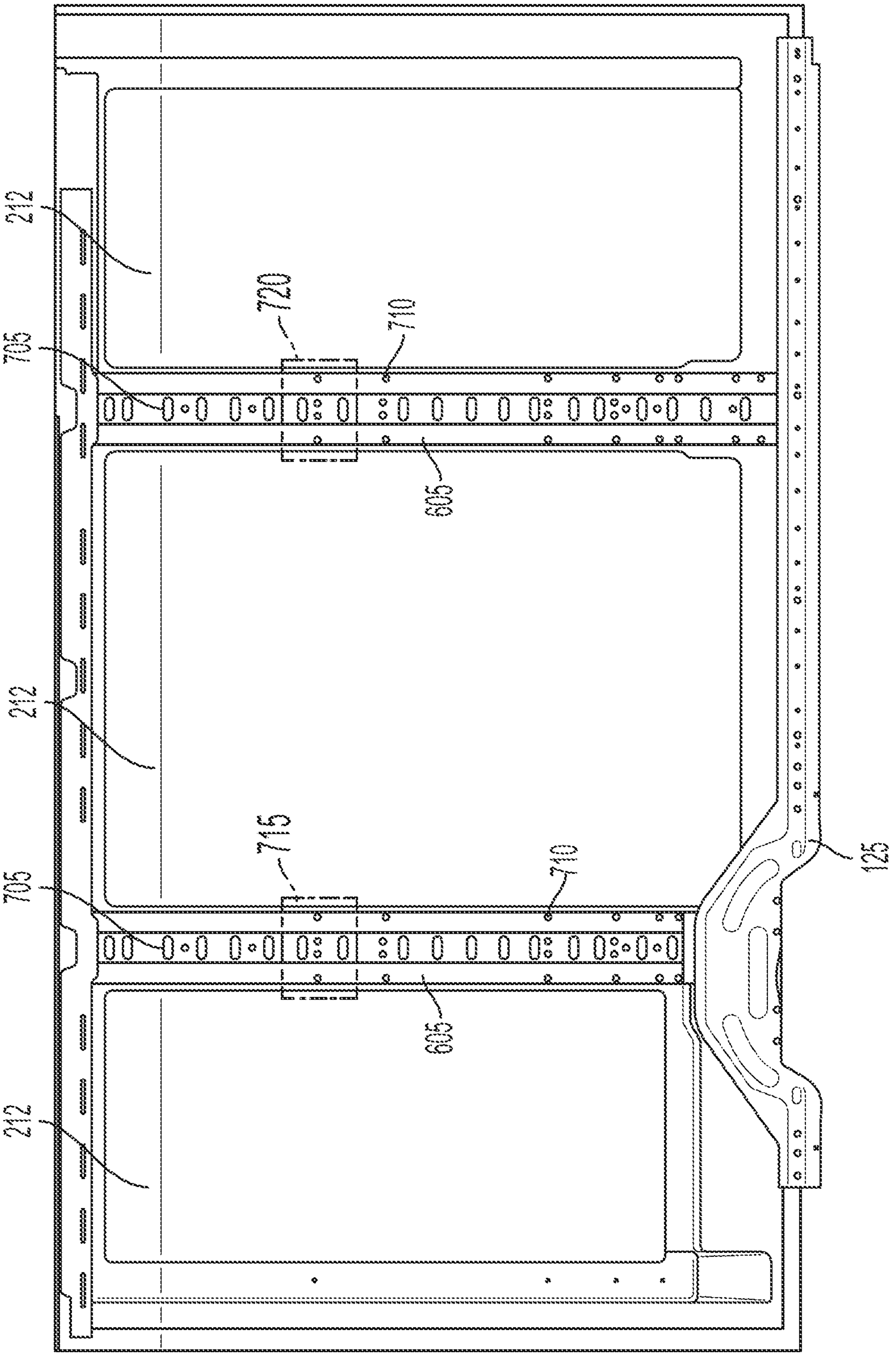
FIG. 7 depicts a perspective view of the vehicle illustrated in FIG. 2, in accordance with an implementation.

FIG. 7 depicts a perspective view of the vehicle 105. The fixtures 605 can include at least one opening 705 and at least one opening 710. The openings 705 can provide an access point for one or more pieces of equipment. For example, an extension cord or power cord could be inserted through the openings 705. The openings 710 can be or include the openings described herein that can correspond to one or more openings of the vehicle panels 210. The openings 710 can receive a fastener to couple the vehicle panels 210, 212 with the vehicle 105. FIG. 7 includes a boundary 715 designating a portion of a first fixture 605 and a boundary 720 designating a portion of a second fixture 605.

Figure 8:
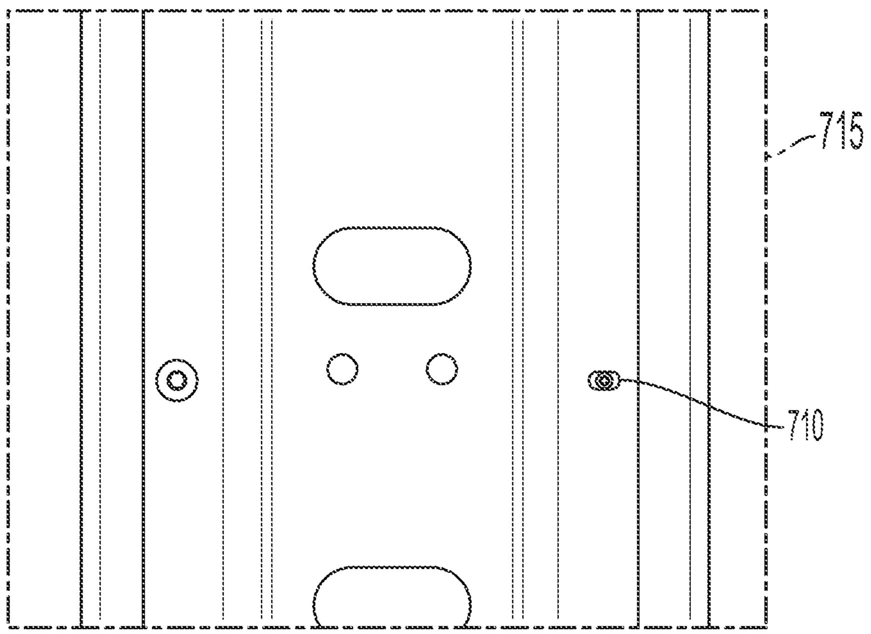
FIG. 8 depicts a perspective view of a fixture of the vehicle illustrated in FIG. 2, in accordance with an implementation.

FIG. 8 depicts a perspective view of a fixture. The fixture can be the fixture 605. The perspective view of the fixture 605 can be or include the boundary 715. The fixture 605 can include the openings 710. FIG. 8 depicts an example of the openings 710 having a two-way slot for the fasteners to couple the vehicle panels 210, 212 with the fixtures 605.

Figure 9:
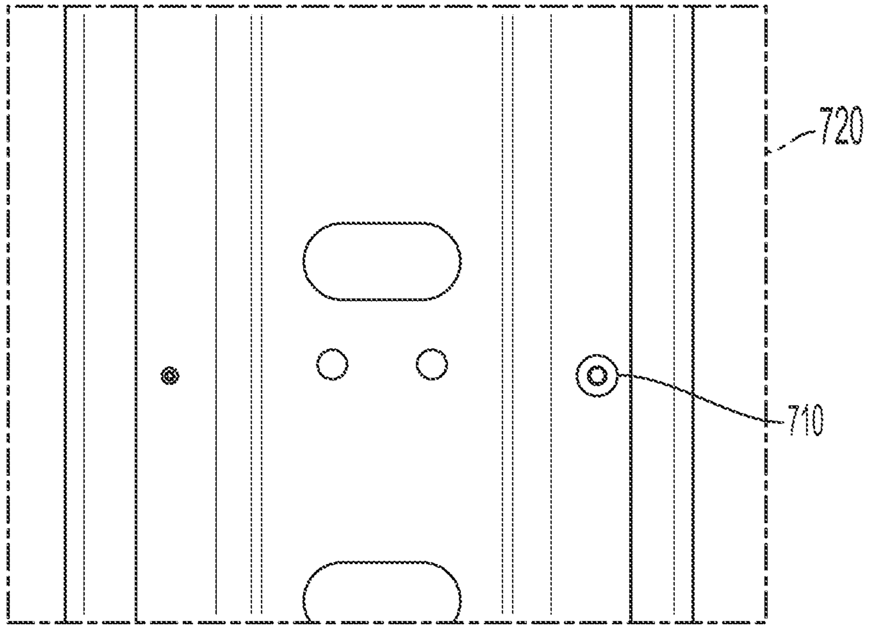
FIG. 9 depicts another perspective view of a fixture of the vehicle illustrated in FIG. 2, in accordance with an implementation.

FIG. 9 depicts a perspective view of a fixture. The fixture can be the fixture 605. The perspective view of the fixture 605 can be or include the boundary 720. The fixture 605 can include the openings 710. FIG. 9 depicts an example of the openings 710 having a four-way hole for the fasteners to couple the vehicle panels 210, 212 with the fixtures 605, and the braces 610. For example, a first opening 710 can include a first hole and a second hole. The first hole can align with an opening 710 of a fixture 605. The second hole can align with an opening of a brace 610. The first opening 710 including the first hole and the second hole can result in a single fastener being able to couple the vehicle panels 210, 212 with both the fixture 605 and the brace 610.

Figure 10:
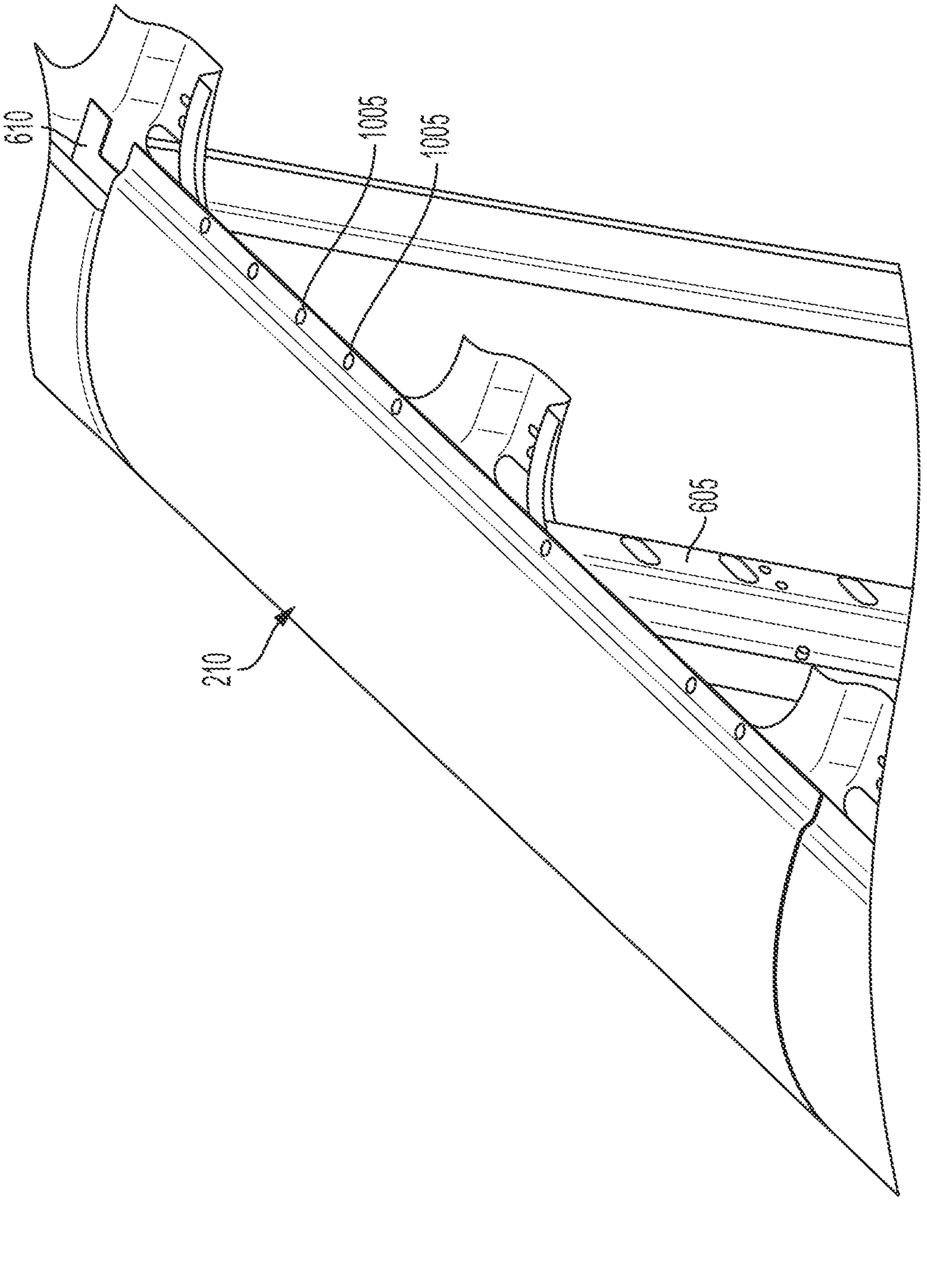
FIG. 10 depicts another perspective view of the vehicle illustrated in FIG. 2, in accordance with an implementation.

FIG. 10 depicts a perspective view of the vehicle 105. The vehicle panels 210 can include at least one opening 1005. The openings 1005 can be at least one of the openings described herein with respect to external vehicle panels 210 or the internal vehicle panels 212. The openings 1005 can be the openings aligning with the openings of the braces 610 as described herein. The openings 1005 can receive a fastener and the fastener can couple the vehicle panels 210 with the braces 610. While FIG. 10 shows the openings 1005 as being located or disposed along a top portion of the vehicle panels 210, the opening 1005 can be located along various portions or areas of the vehicle panels 210. For example, the openings 1005 can disposed vertically along the surface 315 and the openings 1005 can align with the openings 710. The vehicle panels 212 can include the openings 1005 and the openings 1005 can be disposed along the surface 317.

Figure 11:
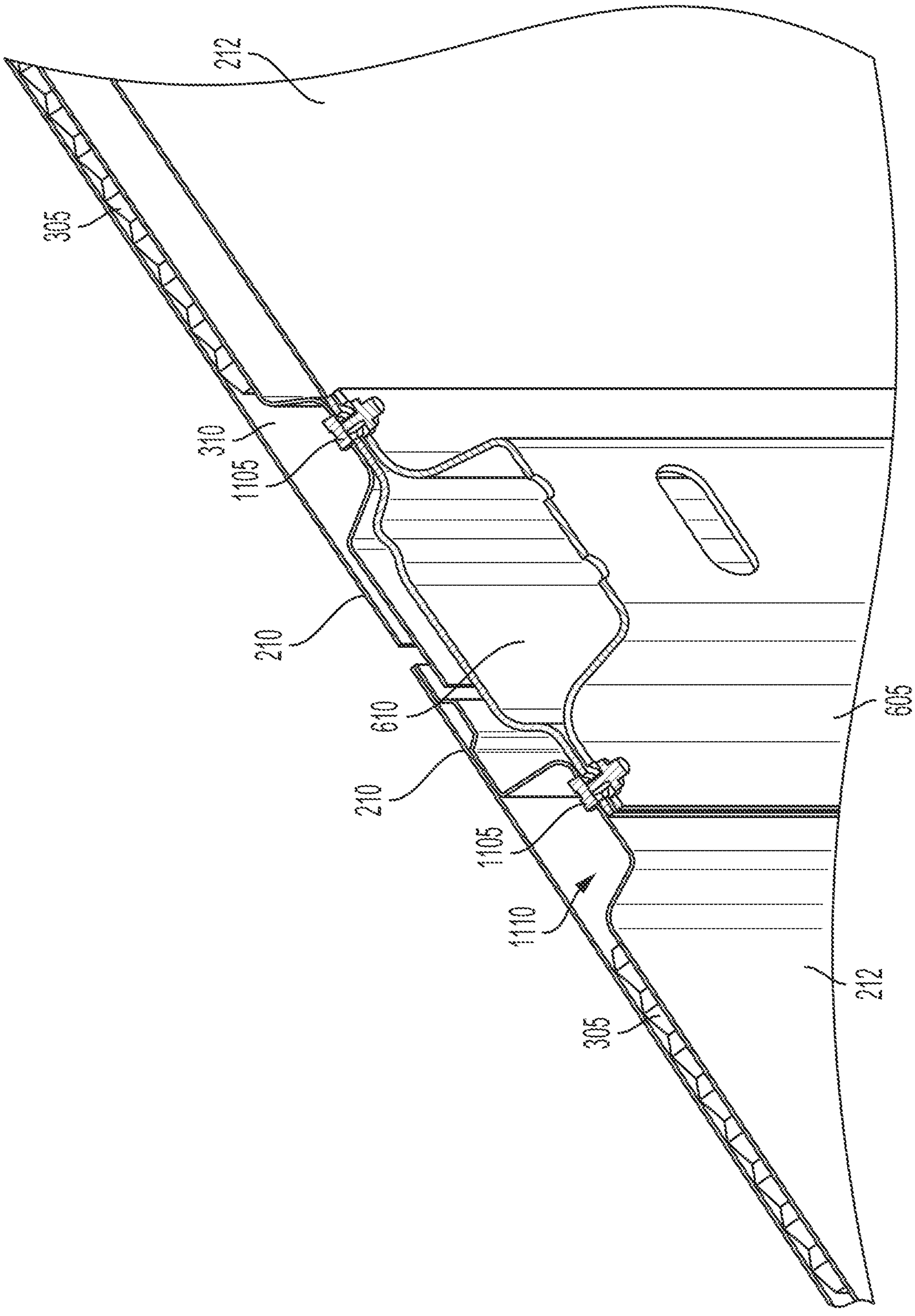
FIG. 11 depicts another perspective view of the vehicle illustrated in FIG. 2, in accordance with an implementation.

FIG. 11 depicts a perspective view of the vehicle 105. The vehicle panels 210, 212 can be coupled, via fasteners 1105, with the fixtures 605 and the braces 610. The fasteners 1105 can be or include the various fasteners described herein. An external vehicle panel 210 and an internal vehicle panel 212 can define at one cavity 1110. The cavity 1110 can be or include at least one of a body, a core, or an empty space between the vehicle panels 210, 212. The structure 305 can occupy at least a portion of the cavity 1110. FIG. 11 depicts an example of a first structure 305 occupying a first cavity 1110 defined by a first external vehicle panel 210 and a first internal vehicle panel 212, and an example of a second structure 305 occupying a second cavity 1110 defined by a second external vehicle panel 210 and a second internal vehicle panel 212.

Figure 12:
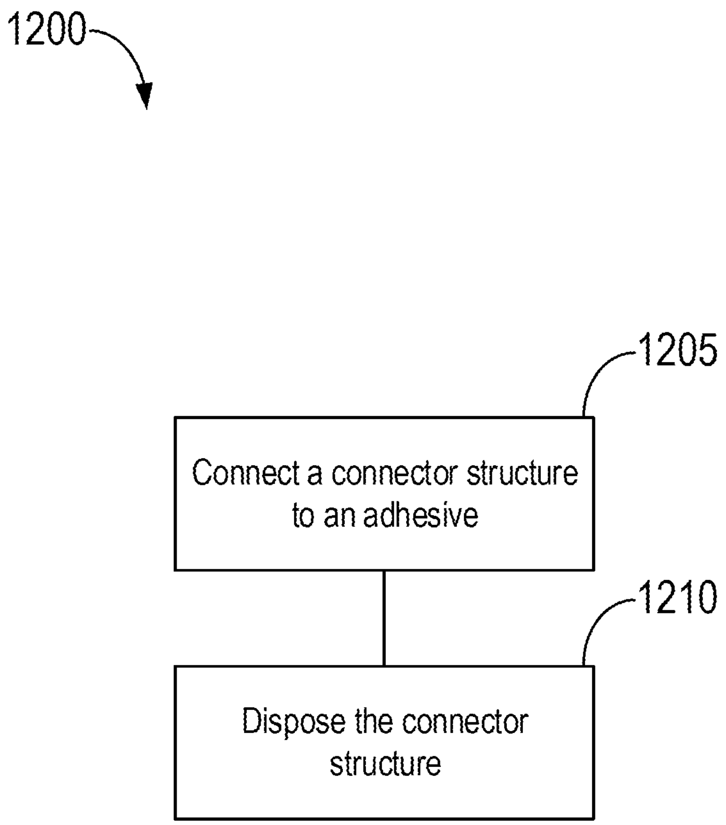
FIG. 12 depicts a flow diagram of a process of manufacturing an apparatus, in accordance with an implantation.

FIG. 12 depicts a flow diagram of a process 1200 of manufacturing an apparatus, in accordance with an implantation. The apparatus can be or include the apparatus 302. The apparatus can include the structure 305. In ACT 1205, a connector structure can be connected to an adhesive. For example, the connector structure can be connected to a first adhesive and a second adhesive. The connector structure can be or include the structure 305. The adhesives can be or include the adhesives 310. The structure 305 be connected to the adhesives 310 by at least one of mounting, placing, attaching, securing, or otherwise coupling the structure 305 with the adhesives 310. The connector structure can connect a first vehicle panel with a second vehicle panel. For example, the structure 305 can connect an external vehicle panel 210 with an internal vehicle panel 212.

In ACT 1210, the connector structure can be disposed. The connector structure can be disposed between the first vehicle panel and the second vehicle panel. For example, the structure 305 can be disposed between the external vehicle panel 210 and the internal vehicle panel 212 by at least one of placing, positioning, situating, or otherwise locating the structure 305 between the external vehicle panel 210 and the internal vehicle panel 212.

The first adhesive can adhere to the connector structure to the first vehicle panel and the second adhesive can adhere the connector structure to the second vehicle panel. For example, a first adhesive 310 can adhere the structure 305 to the external vehicle panel 210 and a second adhesive 310 can adhere the structure 305 to the internal vehicle panel 212. The first adhesive 310 and the second adhesive 310 can adhere the structure 305 to the external vehicle panel 210 and the internal vehicle panel 212 by at least one of attaching, mounting, placing, securing, or coupling the structure 305 with the external vehicle panel 210 and the internal vehicle panel 212.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:

a connector structure configured to connect a first vehicle panel with a second vehicle panel; and the connector structure configured to be disposed between the first vehicle panel and the second vehicle panel, and the connector structure to:

couple with a first adhesive sheet to adhere a first side of the connector structure to the first vehicle panel, the first adhesive sheet including one or more apertures which align with one or more recesses disposed on a surface of the first vehicle panel; and couple with a second adhesive sheet to adhere a second side of the connector structure to the second vehicle panel.

2. The apparatus of claim 1, comprising:

the first vehicle panel and the second vehicle panel configured to define a cavity to house the connector structure; and the connector structure configured to occupy at least a portion of the cavity defined by the first vehicle panel and the second vehicle panel.

3. The apparatus of claim 1, comprising:
the first vehicle panel including a plurality of first vehicle panels;
the second vehicle panel including a plurality of second vehicle panels; and
the plurality of first vehicle panels and the plurality of second vehicle panels configured to define a rear storage area of a vehicle.

4. The apparatus of claim 1, comprising:
the first vehicle panel comprising:
the surface connected to the connector structure; and
a second surface facing outside of a vehicle; and
the second vehicle panel comprising:
a third surface connected to the connector structure; and
a fourth surface facing an inside of the vehicle.

5. The apparatus of claim 1, comprising:
the first vehicle panel and the second vehicle panel having a first insulation value;
the connector structure having a second insulation value; and
the second insulation value larger than the first insulation value.

6. The apparatus of claim 1, comprising:
the one or more recesses configured to produce a stiffness factor.

7. The apparatus of claim 1, comprising:
the connector structure having a plurality of cells; and
the plurality of cells configured to disperse a load applied to at least a portion of at least one of the first vehicle panel or the second vehicle panel.

8. The apparatus of claim 1, comprising:
the connector structure having a plurality of cells; and
the plurality of cells configured to define a plurality of pockets.

9. The apparatus of claim 1, comprising:
the connector structure having a plurality of honeycomb shaped cells.

10. The apparatus of claim 1, comprising:
at least a portion of the connector structure comprises at least one of:
an aluminum material; or
an aramid material.

11. The apparatus of claim 1, comprising:
the connector structure having a lattice shape.

12. The apparatus of claim 1, comprising:
at least one of the first vehicle panel or the second vehicle panel configured to removably couple with a vehicle.

13. A vehicle, comprising:
an apparatus, including:
a connector structure configured to connect a first vehicle panel with a second vehicle panel; and
the connector structure configured to be disposed between the first vehicle panel and the second vehicle panel, and the connector structure to:
couple with a first adhesive sheet to adhere a first side of the connector structure to the first vehicle panel, the first adhesive sheet including one or more apertures which align with one or more recesses disposed on a surface of the first vehicle panel; and
couple with a second adhesive sheet to adhere a second side of the connector structure to the second vehicle panel.

14. The vehicle of claim 13, comprising:
the first vehicle panel and the second vehicle panel configured to define a cavity to house the connector structure; and
the connector structure configured to occupy at least a portion of the cavity defined by the first vehicle panel and the second vehicle panel.

15. The vehicle of claim 13, comprising:
the first vehicle panel including a plurality of first vehicle panels;
the second vehicle panel including a plurality of second vehicle panels; and
the plurality of first vehicle panels and the plurality of second vehicle panels configured to define a rear storage area of the vehicle.

16. The vehicle of claim 13, comprising:
the first vehicle panel comprising:
the surface connected to the connector structure; and
a second surface facing outside of the vehicle; and
the second vehicle panel comprising:
a third surface connected to the connector structure; and
a fourth surface facing an inside of the vehicle.

17. A method, comprising:
connecting a connector structure to a first adhesive sheet and a second adhesive sheet;
disposing the connector structure between a first vehicle panel and a second vehicle panel;
the first adhesive sheet to adhere a first side of the connector structure to the first vehicle panel, the first adhesive sheet including one or more apertures which align with one or more recesses disposed on a surface of the first vehicle panel; and
the second adhesive sheet to adhere a second side of the connector structure to the second vehicle panel.

18. The method of claim 17, comprising:
the connector structure having a plurality of cells; and
the plurality of cells configured to disperse a load applied to at least a portion of at least one of the first vehicle panel or the second vehicle panel.

19. The apparatus of claim 1, comprising:
the first adhesive sheet to contact one or more portions of the surface of the first vehicle panel; and
the one or more portions are without the one or more apertures.

20. The vehicle of claim 13, comprising:
the first adhesive sheet to contact one or more portions of the surface of the first vehicle panel; and
the one or more portions are without the one or more apertures.

* * * * *